United States Patent [19]

McMahon

[11] 4,389,657

[45] Jun. 21, 1983

[54] INK JET SYSTEM

[75] Inventor: James McMahon, New Milford, Conn.

[73] Assignee: Exxon Research and Engineering Co., Florham Park, N.J.

[21] Appl. No.: 203,590

[22] Filed: Nov. 3, 1980

[51] Int. Cl.³ .......... G01D 15/16

[52] U.S. Cl. .......... 346/140 R

[58] Field of Search .......... 346/140 R, 75; 417/322

[56] References Cited

U.S. PATENT DOCUMENTS

| | | | |
|---|---|---|---|
| 3,215,078 | 11/1965 | Stec | 417/322 |
| 3,683,212 | 8/1972 | Zoltan | 310/8.3 |
| 3,828,357 | 8/1974 | Koeblitz | 346/140 |
| 3,831,727 | 8/1974 | Kruspe | 346/140 X |
| 4,005,435 | 1/1977 | Lundquist | 346/75 X |
| 4,011,474 | 3/1977 | O'Neill | 310/8.7 |
| 4,032,929 | 6/1977 | Fischbeck | 346/140 |
| 4,045,801 | 8/1977 | Iwasaki | 346/140 |
| 4,068,144 | 1/1978 | Toye | 346/75 |
| 4,115,036 | 2/1977 | Paterson | 417/322 |
| 4,149,172 | 4/1979 | Heinzl | 346/140 |
| 4,241,357 | 12/1980 | Anestos | 346/140 |
| 4,291,316 | 9/1981 | Kakeno | 346/140 |

OTHER PUBLICATIONS

Piezomotors—Electromechanical Muscle; C. G. O'-Neill, D. S. Randall, and P. C. Smiley; Copyright 1980, Soc. of Automotive Eng., Inc., pp. 1-11.

Description of U.S. Pat. No. 4,011,474; Physics International Co.; 4 pp.

*Primary Examiner*—Joseph W. Hartary

*Attorney, Agent, or Firm*—Norman L. Norris; Kenneth Watov

[57] ABSTRACT

A piezoelectric pump includes a chamber and an orifice for pumping ink from a supply to an ink jet. The piezoelectric pump is similar in construction to the ink jet.

12 Claims, 6 Drawing Figures

INK JET SYSTEM

BACKGROUND OF THE INVENTION

This relates to ink jets which project droplets outwardly from the orifice of a jet toward a printing medium.

Ink jets typically operate by expelling ink from a chamber of specific volume located within or associated with the jet and contracting the volume so as to expell or project a droplet of ink from the ink orifice. In order for an ink jet to operate properly, it is necessary for the jet to be filled with ink such that contraction of the chamber of specific volume does result in the projection of a droplet of ink from the orifice. Filling the chamber with ink is characteristically referred to as the priming function.

A purging function in an ink jet system may be provided so as to clear an ink jet orifice of debris such as dried ink or dust. The purging function resembles the priming function except that greater quantities of ink may be expelled from the orifice for greater periods of time.

A variety of pumping systems have been proposed and used for an ink jet system to provide the priming and/or purging function. One pumping system is disclosed in co-pending application Ser. No. 203,584, filed Nov. 3, 1980 now U.S. Pat. No. 4,359,744 which provides for a peristaltic pumping action utilizing flexible tubing which couples the ink supply or reservoir to the ink jet. As disclosed therein, the tubing is carried by and associated with a disposable reservoir which is carried by a traveling printing head while the pump drive mechanism is mounted in a stationary position. A rather elaborate mechanism is provided for initiating peristaltic pumping action including solenoids which bring the pump drive mechanism into pumping contact with the flexible tubing. Although some of the pump mechanism is carried by the reservoir, the electromechanical portion of the pump is mounted in the stationary position and not carried on the print head or the reservoir. It will also be appreciated that circuitry must be provided which can generate one type of signal for controlling the ink jet and another type of signal for controlling the solenoids.

A variety of other pumps have been proposed for use in conjunction with priming and purging an ink jet. However these pumps are not well suited for mounting on a movable printing head let alone a disposable reservoir such as that disclosed in the aforesaid copending application.

Copending application Ser. No. 078,131, filed Sept. 24, 1979 now U.S. Pat. No. 4,241,357 discloses an ink jet system employing an electrode adjacent the orifice of an ink for the sensing the presence of ink so as to indicate the prime condition. This is accomplished by utilizing an electrode having an orifice therein which is capable of closing circuit so as to deactivate the priming pump driver.

Copending application Ser. No. 203,582, filed Nov. 3, 1980 discloses an ink catcher adjacent the orifice of an ink jet including a sliding cover.

SUMMARY OF THE INVENTION

It is an object of this invention to provide an improved ink jet system for priming and/or purging an ink jet. It is a more specific object of this invention to provide a pump which is relatively simle in construction.

It is a further specific object of this invention to provide a pump which is relatively inexpensive.

It is a further specific object of this invention to provide a pump which does not require the use of a filter.

It is another specific object of this invention to provide a pump which may be carried in its entirety on a moving print head.

It is a further specific object of this invention to provide a pump which may be carried on a disposable reservoir.

It is a still further specific object of this invention to provide a pump which requires a minimum of space.

It is also an object of this invention to provide a pump which may be actuated utilizing the same or substantially the same drive signals applied to the ink jet.

It is a still more specific object of this invention to provide a pump which may be utilized with a variety of reservoirs.

It is a further object of this invention to provide a pump which may utilized in a disposable ink jet system.

It is a further object of this invention to provide a pump which lends itself to use in a facsimile apparatus, typewriter and line printer.

In accordance with these and objects, a preferred embodiment of the invention comprises an ink jet system including an ink jet having a jet chamber, a jet orifice, and a jet electromechanical transducer coupled to the chamber for projecting droplets from the orifice as the volume of the chamber changes in response to the state of energization of the transducer. A pump is coupled to the jet and adapted to communicate with a supply of ink. The pump comprises a pump chamber, a pump orifice in communication with the supply of ink and a pump electrical mechanical transducer coupled to the pump chamber so as to change the volume of the pump chamber as the state of energization of the pump transducer changes thereby pumping ink toward the jet.

In the preferred embodiment of the invention, the pump transducer comprises a piezoelectric material. The pump orifice is characterized by a maximum cross-sectional dimension of 1 to 6 mils. In one embodiment, the pump orifice is characterized by substantially the same maximum cross-sectional dimension as the jet orifice.

The ink supply may comprise an ink reservoir containing the supply of ink where the pump orifice is immersed in the supply within the reservoir.

In accordance with another important aspect of the invention, the pump is actually carried on the reservoir with the ink jet so as to make the entire system disposable.

In the preferred embodiment of the invention, the pump chamber comprises a substantially tubular wall terminating in the pump orifice and the pump transducer extends around the periphery of the tubular wall.

In accordance with another important aspect of the invention, the system comprises control means including a sensing electrode adjacent the jet orifice for sensing the accumulation of ink at the jet orifice and terminating energization of the transducer.

In accordance with another important aspect of the invention, the electrode is adapted to move from a position juxtaposed to the jet orifice to a position remote from the jet orifice so as to permit passage of ink droplets past the electrode.

DETAILED DESCRIPTION OF A PREFERRED EMBODIMENT

Figure 1:
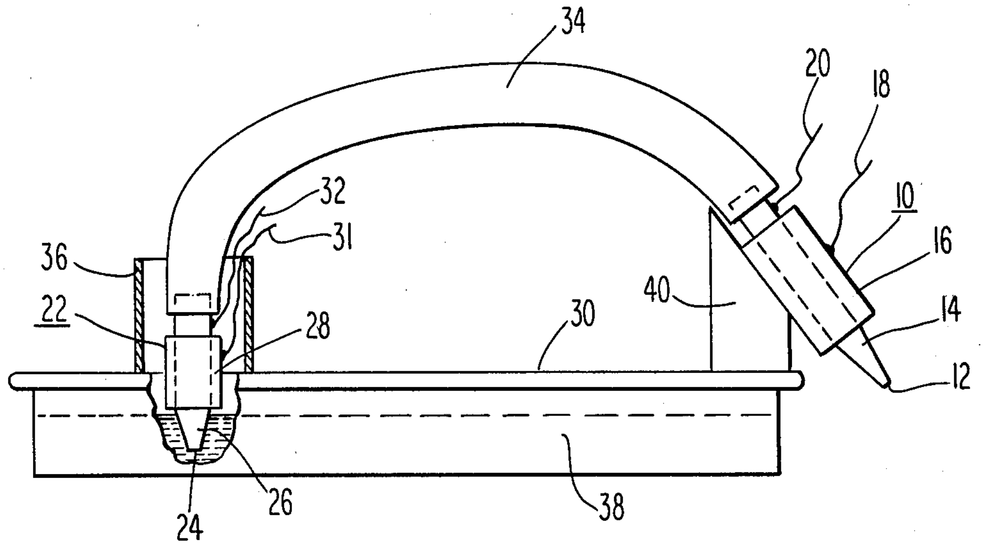
FIG. 1 is a perspective view of an ink jet system representing a preferred embodiment of the invention.

An ink jet system representing the preferred embodiment of the invention will now be described with reference to FIG. 1. The system comprises an ink jet 10 comprising an orifice 12 for projecting ink jet droplets from a substantially tubular chamber 14 surrounded at its periphery by a substantially tubular piezoelectric transducer 16. The transducer 16 is driven by signals applied to conductive leads 18 and 20 connected respectively to the transducer 16, and the tubular chamber 14 so as to contract the volume within the chamber 14 depending upon the state of energization of the transducer 16.

The jet 10 is coupled to a novel piezoelectric pump 22 which is constructed in accordance with this invention. The pump 22 which is relatively inexpensive and simple in construction also comprises an orifice 24 at the outlet of a tubular chamber 26 which is surrounded at its periphery by a piezoelectric transducer 28. The volume of the chamber 26 contracts and expands so as to draw ink from an ink reservoir 30 up into the chamber 26 in response to the state of energization of the transducer 28 which is controlled by drive signals applied between the transducer 28 and the tubular chamber 26 by leads 37 and 32.

The piezoelectric pump 22 supplies ink from the reservoir 30 to the jet 10 through a tube or hose 34. The pump 22 is energized for purposes of priming and/or purging the jet 10. Once priming or purging has been accomplished, the pump 22 may be de-energized by discontinuing the application of drive signals between the leads 30 and 32. The pump 22 is shown in FIG. 1 as mounted within a sleeve 36 such that the orifice 24 is immersed below a supply of ink 38 within the reservoir 30.

As is also shown in FIG. 1, the jet 10 is mounted on a support member 40. It will therefore be appreciated that both the jet 10 as well as the pump 22 are carried by the reservoir 30 so as to permit the pump 22 in its entirety to be disposable along with the remainder of the ink jet system including the reservoir 30 and the jet 10.

It will also be appreciated that the pump 22 is very similar in construction to the ink jet 10. In this connection, it will also be appreciated that the orifice 24 of the pump 22 has a maximum cross-sectional dimension of 1 to 6 mils. which is substantially the same as the maximum cross-sectional dimension of the orifice 12 of the jet 10.

By referring to sectional views 3 and 4, the structure of the jet 10 may be further understood. It will also be understood that the jet structure disclosed therein is applicable to the pump 22. As a consequence, the jet 10 and the pump 22 may, under certain circumstances, be utilized almost interchangeably so as to minimize manufacturing problems in the assembly of the system. Moreover, the same drive impulses or signals may be utilized to drive the jet 10 as well as the pump 22. It will, of course, be appreciated that these drive signals will not be simultaneously applied to the jet 10 and the pump 22. It will also be appreciated that the orifice 24 in the pump 22 is sufficiently small so as to act as an in-line filter and prevent the accumulation of debris and the clogging of the orifice 12 of the jet 10.

Figure 2:
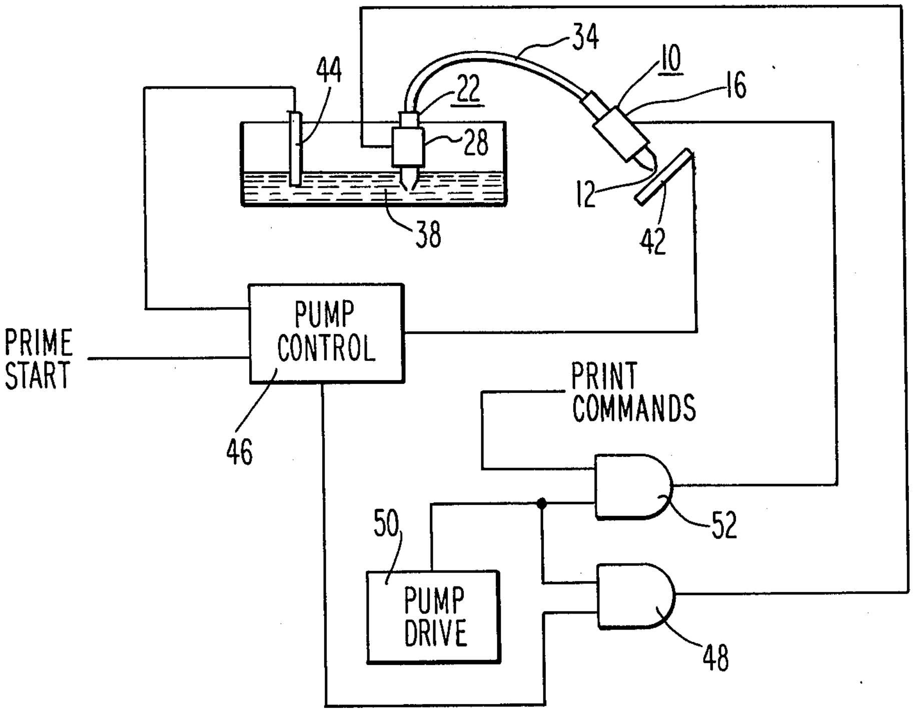
FIG. 2 is a partially schematic diagram of the system of FIG. 1 in combination with control circuitry.

Reference will now be made to FIG. 2 for a discussion of the circuitry associated with FIG. 2. As shown therein, a sensing electrode 42 is juxtaposed to the orifice 12 of the jet 10 for sensing the accumulation of ink at the orifice 12 indicating the primed or purged condition. When the accumulated ink is sensed, a circuit is closed from the electrode 42 back through the ink within the hose 34 to the ink 38 within the reservoir 30. This will produce an output signal from the pump control circuitry 46 so as to inhibit an AND gate 48 thereby preventing drive signals from the pump drive circuit 50 from reaching the transducer 28. In order to initiate the priming or purging function, a prime start signal is applied to the pump control circuit 46.

It will be seen that the same pump drive circuit 50 is also coupled to the transducer 16 of the jet 10. The drive signals from the pump drive circuit 50 are controlled by print commands applied to an AND gate 52 so as to be asynchronous with the priming or purging function.

Figure 3:
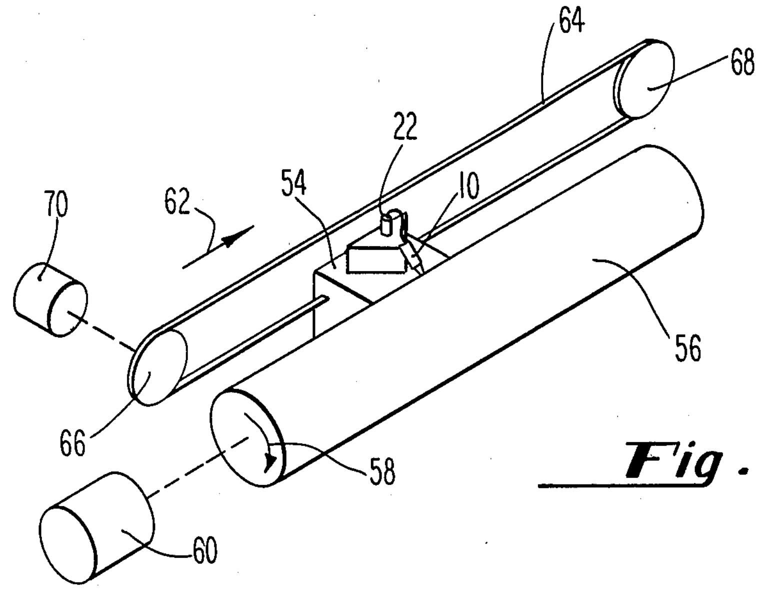
FIG. 3 is a perspective view of the system of FIG. 1 in a facsimile apparatus.
Figure 4:
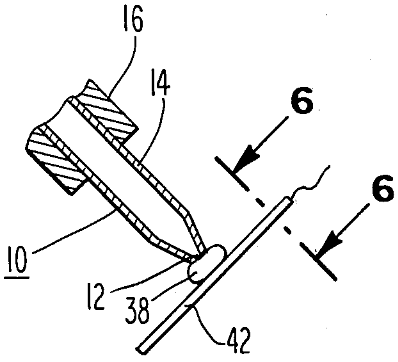
FIG. 4 is an enlarged sectional view of a control electrode juxtaposed to an ink jet as shown in FIG. 2.
Figure 5:
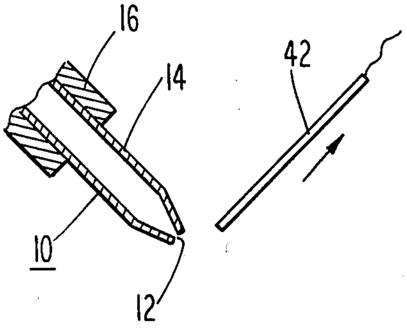
FIG. 5 is the enlarged view of FIG. 4 with the control electrode in another position.
Figure 6:
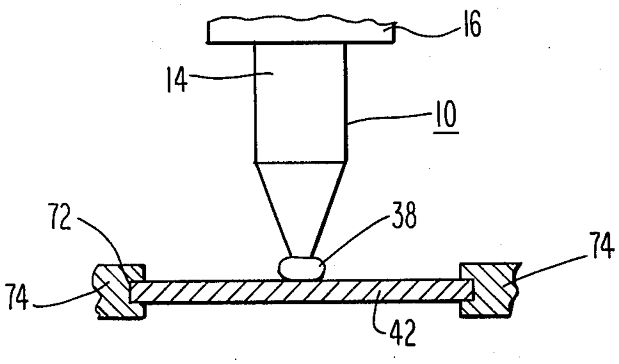
FIG. 6 is a view taken along line 6—6 of FIG. 4 illustrating one way in which the control electrode may be mounted so as to move between the position shown in FIG. 4 and the position shown in FIG. 5.

Referring now to FIG. 3, it will be readily seen that the system of FIG. 1 may be readily mounted on a moving head 54 of a facsimile apparatus which is juxtaposed to a rotating drum 56 adapted to carry copy medium so as to reproduce dark/light variations of a remotely located document. The drum 56 is rotated in a direction indicated by an arrow 58 by means of a motor 60. Simultaneously, the head 54 moves in a direction indicated by an arrow 62 by means of a belt 64 which passes around a pair of pulleys 66 and 68 which are driven by a motor 70. In accordance with one important aspect of the invention, the pump 22 as well as the jet 10 may be removed with the reservoir 30. Referring to FIGS. 4 and 5, it will be seen that the sensing electrode 42 may be moved between a position juxtaposed to the orifice 12 as shown in FIG. 4 to a position clear of or spaced from the orifice 2 as shown in FIG. 5. With the sensing electrode 42 is in the position shown in FIG. 4, it is capable of sensing an accumulation of ink 38 at the orifice 12. Once that accumulation of ink has been sensed, the pump control circuit 46 shown in FIG. 2 terminates pumping by the pump 22, and the jet is primed and ready to begin a print cycle. The sensing electrode 42 may be mounted so that it is juxtaposed to the jet when the jet is in the home or at rest position. Referring to FIG. 6, it will be seen that the sensing electrode 42 which may also act as a cover plate for the orifice 12 may be mounted in tracks 72 of support 74. It will, of course, be appreciated that other structures may be utilized to provide the sliding capability for the sensing electrode 42.

Although a particular ink jet construction employing a piezoelectric transducer 16 has been illustrated and described, it will be appreciated that other types of transducer 16 may be utilized. For example, it is possible to use the pump with a plurality of jets in an array and not just a single jet.

It will also be appreciated that other modifications and embodiments will occur to those of ordinary skill in the art and such modifications and embodiment will fall within the true spirit and scope of the invention as set forth in the appended claims.

What is claimed is:

1. An ink jet system comprising:

an ink jet including an ink chamber, a jet orifice and a jet electromechanical transducer coupled to said chamber for projecting droplets from said orifice as the volume of said chamber changes in response to the state of energization of said transducer;

an ink supply;

a pump coupled to said jet and adapted to communicate with said ink supply, said pump comprising a pump electromechanical transducer and a pump chamber including an orifice for receiving ink through said orifice, said pump chamber being coupled to said pump transducer so as to change the volume of said pump chamber as the state of energization of said pump transducer changes thereby pumping ink toward said jet wherein said pump orifice is characterized by substantially the same maximum cross-sectional dimension of said orifice; and an ink reservoir for containing said supply of ink, said pump orifice being immersed in said supply within said reservoir.

2. The system of claim 1 wherein said pump transducer comprises a piezoelectric material.

3. The system of claim 2 wherein said pump orifice is characterized by a maximum cross-sectional dimension of 1 to 6 mils.

4. The system of claim 1 wherein said pump chamber comprises a substantially tubular wall terminating in said orifice and said pump transducer extends around the periphery of said tubular wall.

5. The system of claim 1 further comprising control means including a sensing electrode adjacent said jet orifice for sensing the accumulation of ink at said orifice and terminating pumping by said pump transducer.

6. The system of claim 5 wherein said sensing electrode is adapted to move from a position juxtaposed to said jet orifice to a position away from and exposing said jet orifice.

7. An ink jet printing apparatus including a disposable reservoir for containing a supply of ink and a piezoelectric pump means adapted for fluid communication with an ink jet to supply ink from said supply to said jet for printing, said piezoelectric pump and said ink jet including orifices being substantially identical in mechanical design, and having the orifice of said pump means immersed in said supply of ink within said reservoir.

8. The apparatus of claim 7 wherein the piezoelectric pump includes a chamber and an orifice leading to the chamber and the orifice is characterized by a maximum cross-sectional dimension of 1 to 6 mils.

9. An ink jet system comprising:

a first ink jet including an ink chamber, a jet orifice and a jet electromechanical transducer coupled to said chamber for projecting droplets from said orifice as the volume of said chamber changes in response to the state of energization of said transducer;

a reservoir for an ink supply; and a second ink jet substantially identical to said first ink jet, said second ink jet being adapted to serve as a pump, said second ink jet having its orifice immersed in said ink supply, and its ink chamber coupled to the chamber of said first ink jet, whereby ink is pumped from said ink supply to said first ink jet via said second ink jet as its chamber undergoes successive volume changes in response to changes in the state of energization of its transducer.

10. The ink jet system of claim 9, wherein the jet orifice of said second ink jet provides for filtering of the ink supplied to said first ink jet.

11. An ink jet system comprising:

an ink supply;

a pair of substantially identical ink jets, one of said ink jets being adapted and operable for asynchronously pumping ink from said ink supply to the other said pair of ink jets for priming and/or purging; and means for inhibiting operation of said one ink jet while operating the other of said pair of ink jets.

12. An ink jet system comprising:

an ink jet including an ink chamber, a jet orifice and a jet electromechanical transducer coupled to said chamber for projecting droplets from said orifice as the volume of said chamber changes in response to the state of energization of said transducer;

an ink supply;

a pump coupled to said jet and adapted to communicate with said ink supply, said pump comprising a pump electromechanical transducer and a pump chamber including an orifice for receiving ink through said orifice, said pump chamber being coupled to said pump transducer so as to change the volume of said pump chamber as the state of energization of said pump transducer changes thereby pumping ink toward said jet; and means for asynchronously priming said pump transducer with respect to said jet transducer to prime and/or purge said pump, said asynchronous means further including means for inhibiting operation of said pump during operation of said ink jet.

* * * * *